United States Patent
Ahmad et al.

(10) Patent No.: US 7,103,518 B2
(45) Date of Patent: Sep. 5, 2006

(54) EMBEDDED SENSOR STEERING SHAFT

(75) Inventors: Atiya M. Ahmad, Southfield, MI (US); Philip Hemenway, Ann Arbor, MI (US); Deanna L. Carroll, Westland, MI (US); Ann Larsen, Southfield, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 964 days.

(21) Appl. No.: 10/029,021

(22) Filed: Dec. 20, 2001

(65) Prior Publication Data

US 2003/0120468 A1   Jun. 26, 2003

(51) Int. Cl.
*G06G 7/48* (2006.01)

(52) U.S. Cl. .......................................................... 703/8

(58) Field of Classification Search ...................... 703/8
See application file for complete search history.

(56) References Cited

U.S. PATENT DOCUMENTS

| | | | |
|---|---|---|---|
| 3,165,942 A * | 1/1965 | Steiner et al. ................ 74/493 |
| 3,940,945 A * | 3/1976 | Hardmark et al. ............. 464/97 |
| 4,366,768 A * | 1/1983 | Kulischenko et al. .... 114/144 E |
| 4,398,173 A * | 8/1983 | Kulischenko et al. ........ 340/439 |
| 5,251,135 A * | 10/1993 | Serizawa et al. .............. 701/42 |
| 5,347,458 A * | 9/1994 | Serizawa et al. .............. 701/41 |
| 5,415,633 A * | 5/1995 | Lazarus et al. ........... 604/95.05 |
| 6,532,833 B1 * | 3/2003 | Lec ........................ 73/862.338 |
| 6,692,026 B1 * | 2/2004 | Gianaris et al. ............. 280/779 |

OTHER PUBLICATIONS

Koyo Seiko "Improvement of Steering Performance and Vehicle Stability through the Development of Steer-by-Wire Technology", May 2001.*
"Piezoelectric Ceramics Characterization", T.L. Jordan, NASA Langley Research Center, Hampton, Virginia. Z. Ounaies, ICASE, Hampton, Virginia. Sep. 2001.*

* cited by examiner

*Primary Examiner*—Hugh Jones
*Assistant Examiner*—Saif Alhija

(57) ABSTRACT

A steer-by-wire assembly 10 is provided, including a flexible polymer steering column shaft 12 having a fixed end 14 and a free rotational end 16, and a control feature 22 in communication with said free rotational end 16. The flexible polymer steering column shaft 12 provides mechanical feel to the steer-by-wire system where prior mechanically actuated or servomotor devices were required.

18 Claims, 1 Drawing Sheet

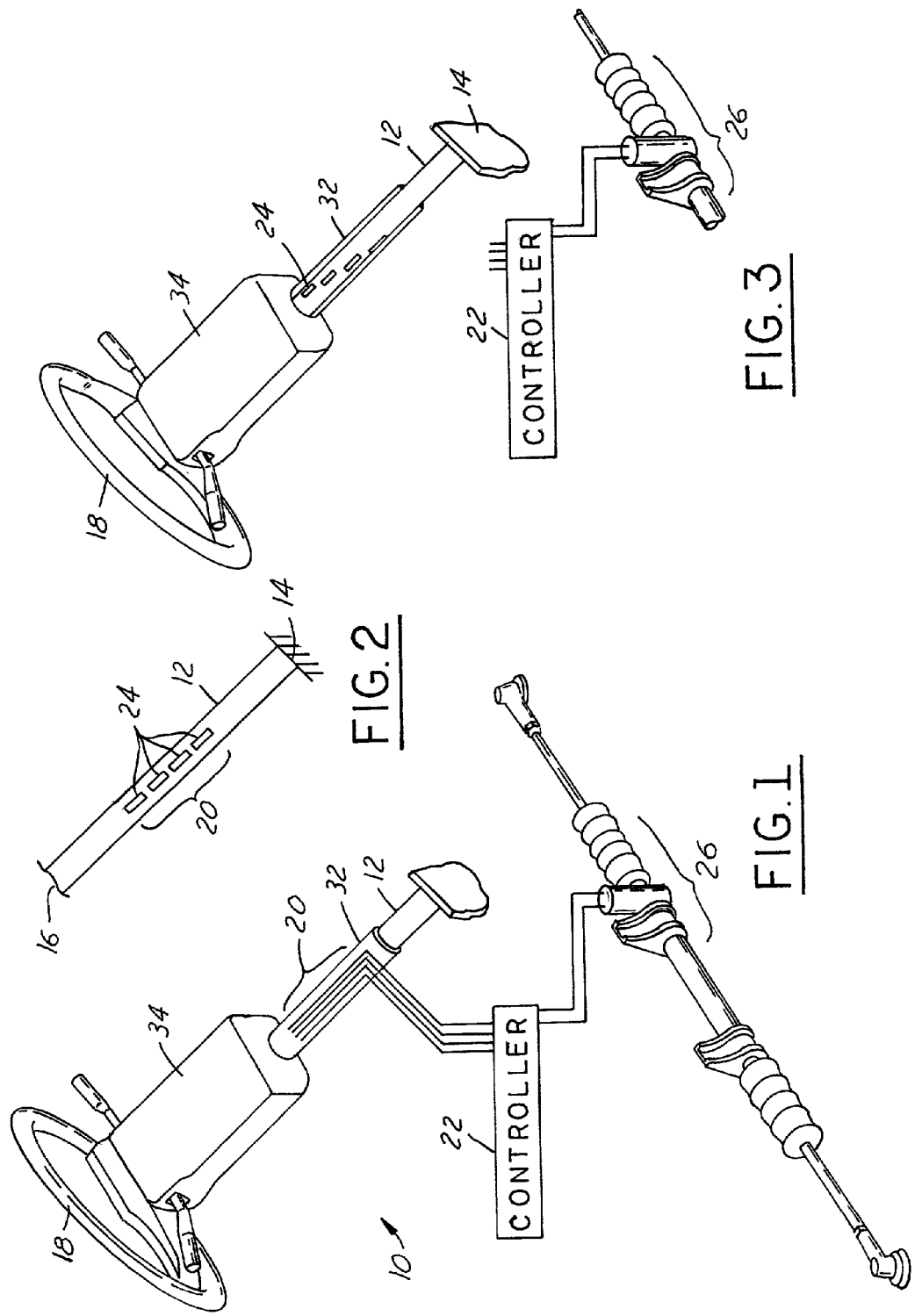

EMBEDDED SENSOR STEERING SHAFT

TECHNICAL FIELD

The present invention relates generally to a steer-by-wire assembly and more particularly to a steer-by-wire assembly having a flexible polymer steering column shaft.

BACKGROUND OF THE INVENTION

The automotive industry has made significant inroads into the practical development of steer-by-wire technology. Steer-by-wire technology involves steering systems for motorized vehicles utilizing electronically controlled steering components. Currently, a wide variety of advancements have been developed for these control systems. These advancements often seek to improve the driver's control over such steer-by-wire systems as well as improve the feel and feedback of such systems such that the driver retains a level of sensory control similar to that experienced in the prior pure mechanical systems.

One approach to steer-by-wire component design has been to develop electronic components that attach to relatively standard steering wheels and steering column shafts. These components, such as magnetic resistance devices, are used to provide resistance to the steering wheel, monitor steering wheel position, and provide road feel. These components often try to additionally incorporate self-centering characteristics into the steering system. Considerable time and effort has been involved in attempting to design these components to simulate the feel of a mechanical system. It has proven difficult, however, to provide a realistic mechanical feel in such systems when most mechanical linkages have been removed.

In addition to the difficulties in providing realistic mechanical feel to the steering system, present steer-by-wire systems can also suffer from the use of steering column shafts similar to those used in mechanical systems. These steering column shafts are typically solid devices fabricated with relatively high strength and weight. While these characteristics may be a necessity in mechanically operated systems, their use may not be appropriate in steer-by-wire systems where their extra strength may not be necessary and their additional weight is unwarranted. The weight detriment of the steering column shaft may be further exacerbated when the weight of components providing resistance, position monitoring, and feedback are mounted to the steering column.

Instead of developing complex electronic components to be mounted to relatively standard steering column shafts, it may be more beneficial to redesign the steering column shaft itself to incorporate some, if not all, of the features normally provided by external components in a steer by wire system. In this way, the functionality of the steering column shaft may be significantly improved, and it may be possible to reduce the weight of the overall steering system. The steering column shaft may also be designed to incorporate functional characteristics that impart a more realistic mechanical feel to the operator.

It would, therefore, be highly desirable to have an improved steering column shaft for use in a steer-by-wire system with improved functional efficiency by incorporating functionality previously supplied by externally mounted components. It would further be highly desirable to have a steering column shaft for use in a steer by wire system that provided improved mechanical feel to the driver-operator.

SUMMARY OF THE INVENTION

It is, therefore, an object of the present invention to provide a steer-by-wire assembly with improved mechanical feel. It is a further object of the present invention to provide a steering column shaft for use in a steer by wire system with improved functionality.

In accordance with the objects of the present invention, a steer-by-wire assembly is provided. The steer-by-wire assembly includes a flexible polymer steering column shaft having a fixed end and a rotatably free end. The steer-by-wire apparatus further includes a control feature in communication with the free rotational end of the flexible polymer steering column shaft.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 1 is an embodiment of a steer-by-wire assembly in accordance with the present invention;

FIG. 2 is a detailed illustration of an embodiment of a flexible polymer steering column shaft for use in a steer-by-wire assembly in accordance with the present invention; and FIG. 3 is an illustration of an embodiment of a steer-by-wire assembly in accordance with the present invention, the flexible polymer steering column shaft shown in a rotated position.

DESCRIPTION OF THE PREFERRED EMBODIMENT(S)

Referring now to FIG. 1, which is an embodiment of a steer-by-wire assembly 10 in accordance with the present invention. The steer-by-wire assembly 10 includes a flexible polymer steering column shaft 12 having a fixed end 14 and a rotatably free end 16 (see FIG. 2). A control feature 18 is in communication with the rotatably free end 16. Although a wide array of user control features 18 are contemplated, one embodiment utilizes a steering wheel as a control feature 18.

The use of a flexible polymer steering column shaft 12 provides a variety of advantages over existing steer-by-wire systems. When an owner/operator rotates steering wheel 18, the twisting of the flexible polymer steering column shaft 12 can create a force on the steering wheel 18 similar in nature to the force felt by the owner/operator in prior art mechanical systems. In fact, the modulus of the flexible polymer steering shaft 12 may be modified to provide a variety of varying force/rotation curves that can be directed towards positive consumer steering feel. The modification of modulus will be discussed in further detail. In addition, while prior art steer by wire systems often necessitated turn limiters and return to center devices, the present invention can eliminate the necessity for these separate components. The force/rotation profile of the flexible polymer steering column shaft 12 can be modified to create practical limitations on the range of turn of the steering wheel 18. The elastic deformation of the flexible polymer steering column shaft 12 will in addition provide a natural self-centering characteristic to the steer by wire assembly 10. In this fashion, the present invention can provide a significant advantage in production and assembly costs over prior art assemblies requiring multiple components.

Although a flexible polymer steering column shaft 12 may be formed in a variety of known methods, one embodiment contemplates forming at least a portion of the shaft using elongated polymer members. The polymer can be orientated during processing in generally helical paths. These formations are well known in the art of polymer formation. One advantage of these formations are that they allow the flexible polymer steering column shaft 12 to exhibit predictable torque fidelity after formation. Another advantage is that torque imposed at the steering wheel 18 can be transmitted to the fixed end 14 without substantial wind up, even if the flexible polymer steering column shaft 12 is substantially stressed. These techniques also serve to further assist in developing varying force/rotation curves for individual applications. It should be understood that although the steering column shaft 12 has been referred to as a flexible polymer steering column shaft 12, it is contemplated that only a portion of the steering column shaft need be formed of flexible polymer to practice the present invention.

The present invention can further include an electroactive assembly 20 in communication with the flexible polymer steering column shaft 12. In one embodiment, the electroactive assembly 20 is embedded in the shaft 12, while in other embodiments the electroactive assembly 20 may simply be attached to the shaft 12. It should be understood that a wide variety of electroactive assemblies are contemplated by the present invention. The electroactive assembly can be used to provide a convenient method of relaying the driver's input via the control feature 18 to a control module 22 of the steer-by-wire system 10. The control module 22 utilizes this information to appropriately control the steering mechanisms 26 in a manner consistent with known steer by wire systems. Thus the torque applied to the steering wheel 18 could be measured by the electroactive assembly 20 and utilized to control the steer-by-wire system 10. In another embodiment, the electroactive assembly 20 can measure the strain in the flexible polymer steering column shaft 12 in order to control the steer-by-wire system 10. In yet still another embodiment, the electroactive assembly 20 can be used to relate the degree and rate of twist of the flexible polymer steering column shaft 12. Although a variety of electroactive assemblies 20 are contemplated by the present invention, in one embodiment, the electroactive assembly 20 includes a sensor 24 or sensors 24. In another embodiment, the electroactive assembly 20 includes a plurality of sensors 24 positioned in an asymmetrical strain distribution while maintaining structural symmetry.

Although it is contemplated that the use of a variety of well known sensor or sensors 24 may be utilized by the present invention, it is also contemplated that the electroactive assembly 20 may provide further utility to the present invention. In addition to the role the electroactive assembly 20 has relating information from the control feature 18 to the control module 22, it may also be utilized to provide additional benefits to the steer-by-wire system 10. The electroactive assembly 20 may be utilized as a method of providing force feedback to the driver. Force feedback is a well known method of providing road feel and other driving sensations to the driver in steer-by-wire systems. In one embodiment, the electroactive assembly 20 provides one or more vibrational modes to the control module 22 in order to provide force feedback. In another embodiment, the electroactive assembly 20 may be utilized to vary the stiffness of the shaft or the shaft modulus. It is well known that the mechanical properties of some polymers may be affected by the application of electrical current. The electroactive assembly 20 may be positioned in a region of high strain on the flexible polymer steering column shaft 12 in order to have an increased effect on shaft modulus. Changing the stiffness or modulus of the steering column shaft 12 may be utilized for both road feel as well as pure mechanical feel as previously described. By combining the electroactive assembly 20 with the flexible polymer steering column shaft 12, the present invention can accomplish the same functions that often previously required mechanically actuated or servomotor devices. In addition, the electroactive assembly 20, by electronically effecting the modulus of the flexible polymer steering column shaft 12, may be used to remove modal resonances or to enhance the handling and comfort of the driver.

Although the electroactive assembly 20 may take on a variety of forms and positions within the steer-by-wire assembly 10, in one embodiment it is contemplated that the electroactive assembly 20 will include a piezoceramic device. In another embodiment, it is contemplated that the electroactive assembly 20 take the form of a solid polymer composite bundle or tube. The electroactive assembly 20 in such an embodiment can be preferably formed using unidirectional fiber reinforcements or using braided fiber socks. Although a number of specific electroactive assemblies 20 have been described, it should be understood that a wide variety of electroactive assemblies 20 and substitution will become obvious to those skilled in the art and are contemplated by the present invention.

It should be understood that the present invention can be utilized in combination with a variety of known components as well. Independent feedback components may be mounted in communication with the flexible polymer steering shaft component 12 in order to provide simulated road feel. In addition, guide components 32 may be utilized to hold the flexible polymer steering column shaft 12 in place and prevent any undesirable deflections of the shaft 12 during operation. Finally, a control cluster 34 may be included to provide drivers with a host of controls for vehicle operation. Control clusters 34 are well known and widely utilized in the automotive industry.

While the invention has been described in connection with one of more embodiments, it is to be understood that the specific mechanisms and techniques which have been described are merely illustrative of the principles of the invention. Numerous modifications may be made to the methods and apparatus described without departing from the spirit and scope of the invention as described and defined by the appended claims.

What is claimed is:

1. A simulated steering assembly comprising:
   a flexible polymer steering column shaft having a fixed end and a free rotational end; and
   a control feature in communication with said free rotational end;
   said control feature axially twisting said flexible polymer steering column shaft when rotated, said FPSCS elastically twisting;
   an electroactive assembly in communication with said flexible polymer steering column shaft; and
   a steer-by-wire control module in electronic communication with said electroactive assembly.

2. A simulated steering assembly as described in claim 1 wherein said control feature is a steering wheel.

3. A simulated steering system assembly as described in claim 1 wherein said electroactive assembly comprises at least one sensor.

4. A simulated steering system assembly as described in claim 1 wherein said electroactive assembly comprises at least one piezoceramic device.

5. A simulated steering assembly as described in claim 1 wherein said electroactive assembly can adjust the modulus of said flexible polymer steering column shaft by altering the mechanical properties of said flexible polymer steering column shaft.

6. A simulated steering assembly as described in claim 1 wherein said electroactive assembly imparts road feel on said flexible polymer steering column shaft.

7. A simulated steering assembly as described in claim 1 wherein said electroactive assembly is embedded in said flexible polymer steering column shaft.

8. A simulated steering assembly comprising:
 a flexible polymer steering column shaft having a fixed end and a rotationally free end;
 a steering wheel in communication with said rotationally free end, said steering wheel axially twisting said flexible polymer steering column shaft when rotated such that said flexible polymer steering column shaft elastically twists; and
 an electroactive assembly in communication with said flexible polymer steering column shaft;
 steering mechanisms; and
 a steer-by-wire control module in electronic communication with said electroactive assembly and controlling said steering mechanisms in response to signals from said electroactive assembly.

9. A simulated steering assembly as described in claim 8 wherein said electroactive assembly comprises at least one sensor.

10. A simulated steering assembly as described in claim 8 wherein said electroactive assembly comprises at least one piezoceramic device.

11. A simulated steering assembly as described in claim 8 further comprising:
 at least one guide element in communication with said flexible polymer steering column shaft and minimizing non-rotational deflections of said flexible polymer steering column shaft.

12. A simulated steering assembly as described in claim 8 wherein said electroactive assembly can adjust the modulus of said flexible polymer steering column shaft.

13. A simulated steering assembly as described in claim 8 wherein said at least one sensor element senses a degree of twist of said flexible polymer steering column shaft.

14. A simulated steering assembly as described in claim 8 wherein said electroactive assembly imparts road feel on said flexible polymer steering column shaft.

15. A method of controlling a steer-by-wire assembly utilizing a control feature and a flexible polymer steering column shaft having a fixed end and a free rotational end comprising;
 rotating the free rotational end in response to a driver moving said control feature;
 measuring the rotation of the flexible polymer steering column shaft using an electroactive assembly in communication with said flexible polymer steering column shaft; and
 activating a steer-by-wire steering mechanism in response to said electroactive assembly.

16. A method as described in claim 15 further comprising:
 adjusting the modulus of said flexible polymer steering column shaft utilizing said electroactive assembly to provide feedback to said driver.

17. A method as described in claim 15 further comprising:
 removing modal resonances of said flexible polymer steering column shaft utilizing said electroactive assembly.

18. A method as described in claim 15 wherein said electroactive assembly includes a solid polymer composite bundle embedded in said flexible polymer steering column shaft.

\* \* \* \* \*